(12) United States Patent
Wessén

(10) Patent No.: US 12,174,611 B2
(45) Date of Patent: Dec. 24, 2024

(54) METHOD OF CONTROLLING AN INDUSTRIAL SYSTEM, CONTROL SYSTEM AND INDUSTRIAL SYSTEM

(71) Applicant: ABB Schweiz AG, Baden (CH)

(72) Inventor: Johan Wessén, Västerås (SE)

(73) Assignee: ABB Schweiz AG, Baden (CH)

( * ) Notice: Subject to any disclaimer, the term of this patent is extended or adjusted under 35 U.S.C. 154(b) by 462 days.

(21) Appl. No.: 17/434,063

(22) PCT Filed: Mar. 7, 2019

(86) PCT No.: PCT/EP2019/055758
§ 371 (c)(1),
(2) Date: Aug. 26, 2021

(87) PCT Pub. No.: WO2020/177870
PCT Pub. Date: Sep. 10, 2020

(65) Prior Publication Data
US 2022/0137597 A1    May 5, 2022

(51) Int. Cl.
*G05B 19/41* (2006.01)
*G05B 19/4155* (2006.01)
(52) U.S. Cl.
CPC .......... *G05B 19/4155* (2013.01); *G05B 2219/31449* (2013.01)
(58) Field of Classification Search
USPC ........................................... 700/28
See application file for complete search history.

(56) References Cited

U.S. PATENT DOCUMENTS 6,281,465 B1    8/2001  Müller et al.
2007/0038898 A1  2/2007  Clee et al.
(Continued)

FOREIGN PATENT DOCUMENTS

CN    101872444 A   10/2010
CN    104010774 A    8/2014
(Continued)

OTHER PUBLICATIONS

European Office Action; Application No. 19711268.3; Completed: May 26, 2023; 7 Pages.
(Continued)

*Primary Examiner* — Hien D Khuu
(74) *Attorney, Agent, or Firm* — Whitmyer IP Group LLC

(57) ABSTRACT

A method of controlling an industrial system including at least one agent, the method including providing a representation of the industrial system as a finite state machine, the state machine including a plurality of nodes and a plurality of edges, where each node represents a discrete system state of the industrial system, each edge represents an action for a state transition between system states represented by two of the nodes, and at least one execution value is associated with at least one of the edges; executing at least one action by the at least one agent, the at least one action being represented by at least one of the edges; and modifying at least one execution value associated with at least one of the edges representing the at least one executed action, based on an outcome of the at least one executed action.

19 Claims, 2 Drawing Sheets

(56) References Cited

U.S. PATENT DOCUMENTS

| | | | | |
|---|---|---|---|---|
| 2008/0168010 | A1* | 7/2008 | Challenger | G06F 9/4856 706/12 |
| 2009/0234467 | A1* | 9/2009 | Sabe | G05B 19/045 700/47 |
| 2012/0304093 | A1* | 11/2012 | Magnusson | G06F 9/451 715/764 |
| 2014/0201571 | A1 | 7/2014 | Hosek et al. | |
| 2014/0280528 | A1* | 9/2014 | Brandes | G05B 19/056 709/204 |
| 2018/0036774 | A1 | 2/2018 | Lukka et al. | |
| 2018/0172450 | A1* | 6/2018 | Lalonde | G01C 21/3407 |
| 2019/0086894 | A1* | 3/2019 | Tenorth | G05B 19/042 |
| 2019/0171925 | A1* | 6/2019 | Arnold | G06F 16/3329 |

FOREIGN PATENT DOCUMENTS

| | | | | |
|---|---|---|---|---|
| CN | 109062200 A | * | 12/2018 | ........... G05D 1/0223 |
| CN | 109195751 A | | 1/2019 | |
| CN | 109922930 A | | 6/2019 | |
| EP | 3086189 A2 | | 10/2016 | |
| EP | 3214510 A1 | * | 9/2017 | .............. B25J 9/163 |
| WO | 2018053187 A1 | | 3/2018 | |
| WO | WO-2018086677 A1 | * | 5/2018 | .............. B25J 9/161 |

OTHER PUBLICATIONS

International Preliminary Report on Patentability; Application No. PCT/EP2019/055758; Issued: Aug. 25, 2021; 8 Pages.

International Search Report and Written Opinion of the International Searching Authority; Application No. PCT/EP2019/055758; Completed: Nov. 4, 2019; Mailing date: Nov. 13, 2019; 12 Pages.

Chinese First Office action and Search Report; Application No. 201980093328.3; Completed May 28, 2024; 19 Pages.

* cited by examiner

METHOD OF CONTROLLING AN INDUSTRIAL SYSTEM, CONTROL SYSTEM AND INDUSTRIAL SYSTEM

TECHNICAL FIELD

The present disclosure generally relates to control of industrial systems. In particular, a method of controlling an industrial system comprising at least one agent, a control system for controlling an industrial system comprising at least one agent, and an industrial system comprising a control system, are provided.

BACKGROUND

Predicting the execution quality of a robot program for controlling an industrial robot, is difficult. One reason for this difficulty is that there are situations where the outcome of one or more actions of the industrial robot vary. A further reason for this difficulty is that there are situations where there are multiple ways in which the industrial robot can solve a task, but it is not known which way will be the fastest and/or least error prone before deploying the robot program.

Creating efficient robot programs is difficult, time consuming and does often not take the actual performance of the robot program into account. When the actual performance is neglected, the industrial robot will not produce at its best. Sometimes when robot programs are deployed, they stay the same regardless of the quality of the program, even if something happens to the robot that deteriorates the program.

Furthermore, it is typically desired to detect deteriorated execution quality of a robot program as early as possible, e.g. to save costs and/or for safety reasons. However, due to the difficulty of detecting errors in a robot program, the reason for a performance decline it is often never detected, or is detected too late. Error tracking is often performed ad-hoc.

A robot program may fail for various reasons, such as due to broken robotic fingers or fixtures, oil leaking from a gearbox, and temperature fluctuations in the environment causing material properties to change. A wide range of potential error sources may lie behind extended execution times and decreased success rates of physical actuators controlled by the program.

WO 2018086677 A1 discloses a method for determining possible transitions of system states in an industrial system with a plurality of agents with discrete agent states.

SUMMARY

One object of the present disclosure is to provide a method of controlling an industrial system, which method provides an improved control of the industrial system.

A further object of the present disclosure is to provide a method of controlling an industrial system, which method provides an improved prediction of execution quality of the industrial system.

A still further object of the present disclosure is to provide a method of controlling an industrial system, which method provides a more efficient control of the industrial system.

A still further object of the present disclosure is to provide a method of controlling an industrial system, which method provides a more efficient error detection of an industrial system.

A still further object of the present disclosure is to provide a method of controlling an industrial system, which method enables a fast detection of errors in the industrial system.

A still further object of the present disclosure is to provide a method of controlling an industrial system, which method solves several or all of the foregoing objects in combination.

A still further object of the present disclosure is to provide a control system for controlling an industrial system, which control system solves one, several or all of the foregoing objects.

A still further object of the present disclosure is to provide an industrial system comprising a control system, which industrial system solves one, several or all of the foregoing objects.

According to one aspect, there is provided a method of controlling an industrial system comprising at least one agent, the method comprising providing a representation of the industrial system as a finite state machine, the state machine comprising a plurality of nodes and a plurality of edges, where each node represents a discrete system state of the industrial system, each edge represents an action for a state transition between system states represented by two of the nodes, and at least one execution value is associated with at least one of the edges; executing at least one action by the at least one agent, the at least one action being represented by at least one of the edges; and modifying at least one execution value associated with at least one of the edges representing the at least one executed action, based on an outcome of the at least one executed action.

By modifying one or more execution values in this manner based on outcomes of executed actions, various types of values of choosing an action can be determined. A model, i.e. the state machine representation of the industrial system, is thereby also made more conforming to reality. The modified execution values can therefore be used to provide an improved control of the industrial system. A program for controlling the industrial system can thereby be optimized and/or troubleshooting of the industrial system can be made more efficiently.

The method according to the present disclosure is based on the insight that by providing a principled way of representing the industrial system as a state machine, also actual performance of the industrial system can be tracked in a principled way by means of the state machine representation. By modifying execution values of edges in the state machine representation of the industrial system, it is possible to keep track of the high level performance of each agent. The performance of the actions and the performance of each agent can thereby be compared over time, or be compared with target performances.

The execution of at least one action may comprise executing a plurality of actions by one or more agents, such as a plurality of different actions by one or more agents. For example, the program for controlling the industrial system may run several times during execution of the plurality of actions.

The at least one execution value may comprise a time of executing the action. When the state machine comprises modified execution values representing actual execution times of actions, a time optimization of a program for controlling the industrial system can be improved. That is, the industrial system can be controlled to carry out various tasks faster.

The at least one execution value may comprise a probability of success of the action. Alternatively, or in addition, the at least one execution value may comprise a degree of success of the action. When the state machine comprises modified execution values representing actual probabilities of success, or actual degrees of success, of actions, a less error prone and/or faster control of the industrial system can be provided.

Further examples of execution values according to the present disclosure are energy consumption and waste associated with an action.

A plurality of execution values may be associated with at least one of the edges. The plurality of execution values may be referred to as execution data. Examples of execution data are distributions and statistics of execution values.

The at least one agent may be a physical actuator. Examples of physical actuators are industrial robots, manipulators, conveyor belts, mobile robots such as automated guided vehicles (AGV) with or without manipulators, and unmanned aerial vehicles (UAV) commonly known as drones. Each agent may be said to constitute a sub-system of the industrial system.

The execution of the at least one action by the at least one agent may comprise executing at least one action by each of a plurality of agents. That is, a first agent may execute one or more actions and a second agent may execute one or more actions.

The at least one action may comprise a movement of the at least one agent. Thus, the at least one action may be a physical action.

The method may further comprise optimizing state transitions of the state machine based on the at least one modified execution value. In this way, modified execution values can be used to improve performance of the industrial system. The optimization may for example comprise minimizing a cycle time, minimizing errors, increasing efficiency, minimizing waste and/or minimizing energy consumption. The optimization may be made by means of machine learning, for example by means of dynamic programming.

The method may further comprise executing a plurality of actions by at least one agent, each action being represented by one of the edges; determining at least one execution value based on an outcome of each of the plurality of executed actions; and evaluating whether execution values of a group of the determined execution values differ from corresponding execution values of the state machine, or from corresponding target execution values.

The evaluation of whether execution values of the group of the determined execution values differ from corresponding execution values of the state machine, or from corresponding target execution values, may comprise evaluating the execution values of the group collectively. By such collective evaluation, improbable events, such as a non-nominal system state or a probability of a non-nominal system state, can be detected even if each execution value of the group lies within a standard deviation of a corresponding execution value and/or of a corresponding target execution value. A warning may be issued if the collective evaluation indicates an improbable event, e.g. if it is determined that a collective probability distribution of the group of differing execution values indicates an improbable event.

The method may further comprise executing a plurality of actions by each of a plurality of agents; and determining whether the group of the determined execution values is associated with a single agent of the plurality of agents. By determining whether the group of the determined execution values is associated with a single agent, a potential error of this agent can be detected earlier.

The determination whether execution values of a group of the determined execution values differ from corresponding execution values of the state machine, or from corresponding target execution values, may be made by means of probability distributions.

The method may further comprise modifying a program of the industrial system based on the at least one modified execution value, the program comprising at least one command for executing at least one action by the at least one agent; and executing the program. When the at least one execution value of the state machine is modified, also the state machine is modified. Thus, the method may further comprise modifying the program based on the modified state machine.

According to a further aspect, there is provided a control system for controlling an industrial system comprising at least one agent, the control system comprising a data processing device and a memory having a computer program stored thereon, the computer program comprising program code which, when executed by the data processing device, causes the data processing device to perform the steps of providing a representation of the industrial system as a finite state machine, the state machine comprising a plurality of nodes and a plurality of edges, where each node represents a discrete system state of the industrial system, each edge represents an action for a state transition between system states represented by two of the nodes, and at least one execution value is associated with at least one of the edges; commanding execution of at least one action by the at least one agent, the at least one action being represented by at least one of the edges; and modifying at least one execution value associated with at least one of the edges representing the at least one executed action, based on an outcome of the at least one executed action. The computer program may further comprise program code which, when executed by the data processing device, causes the data processing device to perform, or command execution of, any step according to the present disclosure.

According to a further aspect, there is provided an industrial system comprising a control system according to the present disclosure. The industrial system may comprise a robot system. The robot system may comprise one or more agents, such as manipulators.

BRIEF DESCRIPTION OF THE DRAWINGS

Further details, advantages and aspects of the present disclosure will become apparent from the following embodiments taken in conjunction with the drawings, wherein.

DETAILED DESCRIPTION

Figure 1:
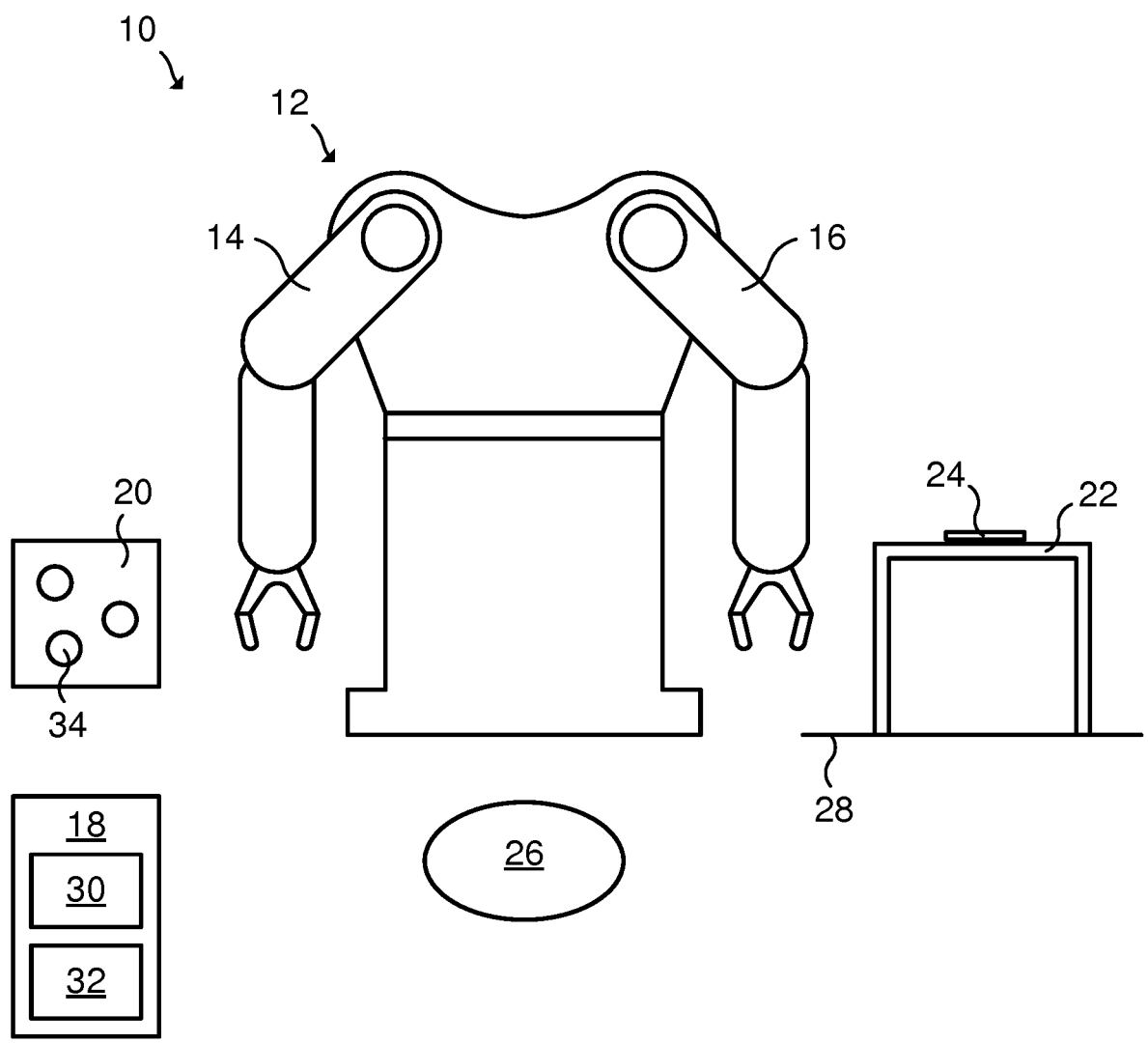
FIG. 1: schematically represents an industrial system.

In the following, a method of controlling an industrial system comprising at least one agent, a control system for controlling an industrial system comprising at least one agent, and an industrial system comprising a control system, will be described. The same reference numerals will be used to denote the same or similar structural features.

FIG. 1 schematically represents an illustrative example of an industrial system 10. The industrial system 10 of this example comprises an industrial robot 12 having two manipulator arms 14, 16. The industrial system 10 of this example further comprises a control system 18, a feeder 20, a table 22, a coaster 24 on the table 22, and a waste bin 26. The table 22 is positioned on a floor 28. The two arms 14, 16 of the robot 12 constitute agents having discrete agent states. The industrial system 10 thereby comprises a first agent in the form of a left arm 14 and a second agent in the form of a right arm 16. The industrial system 10 may however comprise alternative or additional types of agents, such as conveyor belts, mobile robots, or other physical actuators.

The control system 18 comprises a data processing device 30 (e.g. a central processing unit, CPU) and a memory 32. A computer program is stored in the memory 32. The computer program comprises program code which, when executed by the data processing device 30, causes the data processing device 30 to execute any step, or to command execution of any step, according to the present disclosure.

The industrial system 10 is configured to carry out the following tasks or actions. The left arm 14 picks an item 34 from the feeder 20 and hands the item 34 over to the right arm 16 allowing the right arm 16 to receive the item 34. The right arm 16 receives the item 34. The right arm 16 sets the item 34 on the coaster 24. Each of the left arm 14 and the right arm 16 thereby has discrete agent states "empty" denoted by digit 0 and "hold an item" denoted by digit 1. The left arm 14 and the right arm 16 can also have additional agent states, but it is not necessary to consider them for the purposes of the present example. It is assumed that the industrial system 10 comprises sensors that allow identification of each considered agent state such that at each point in time, agent states of all agents are known.

Figure 2:
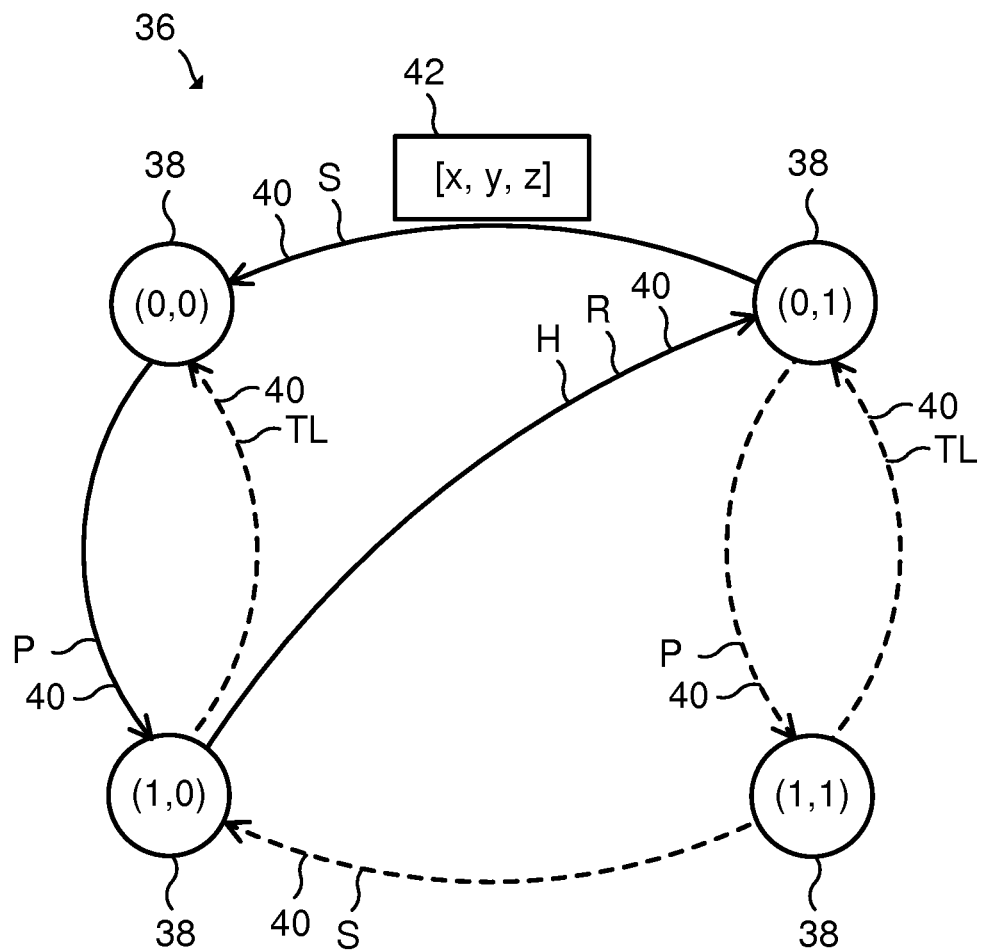
FIG. 2: schematically represents a finite state machine representation of the industrial system in FIG. 1.

FIG. 2 schematically represents a representation of the industrial system 10 in FIG. 1 as a finite state machine 36. A system state can be expressed as a combination of all agent states of the industrial system 10. The state machine 36 constitutes a model of the industrial system 10.

As shown in FIG. 2, the state machine representation comprises a plurality of nodes 38 and a plurality of edges 40. Each node 38 represents a discrete system state of the industrial system 10. Each edge 40 is connected between two nodes 38 and represents an action required for a state transition between the two system states represented by the two nodes 38.

Each node 38 comprises a component for each agent, the value of each component corresponding to an agent state of the respective agent. Since, due to the earlier assumption, all agent states are known at each point in time, also the system state is always known.

In the example in FIGS. 1 and 2, each node 38 has two components. The first component represents the agent state of the left arm 14 and the second component represents the agent state of the right arm 16. The first and second component may each adopt the values 0 and 1 ("empty" and "hold an item"). The industrial system 10 can thereby adopt four unique system states (0, 0), (0, 1), (1, 0) and (1, 1).

In order to transition between different system states, one or both agents 14, 16 need to carry out an action. Available actions depend on the configuration of the industrial system 10. In the present example, the left arm 14 is configured to carry out the actions "pick" denoted by "P", "hand over" denoted by "H", and "throw left" denoted by "TL", and the right arm 16 is configured to carry out the actions "receive" denoted by "R", "set" denoted by "S", and "throw right" denoted by "TR".

A programmer familiar with the configuration of the industrial system 10 and with the tasks to be carried out the by industrial system 10 defines a plurality of rules. The rules determine appropriate actions to be taken at certain pre-conditions in order to arrive at an expected post-condition. Each rule comprises a pre-condition of at least one agent state that is to be changed, a post-condition of the at least one agent state, and an action resulting in a corresponding transition of the at least one agent state. For example, one rule may determine that whenever the left arm 14 holds an item 34, the appropriate action is "hand over" H and the expected agent state of the left arm 14 after the action is "empty" 0. A further rule may determine that the agent state of the left arm 14 should not change from "hold an item" 1 to "empty" 0 without the interaction with the right arm 16. A further rule may determine that the agent state of the right arm 16 should not change from "empty" 0 to "hold an item" 1 without interaction with the left arm 14.

The hardware configuration of the industrial system 10 would allow the agent state of the left arm 14 to be changed from "hold an item" 1 to "empty" 0 without interaction with the right arm 16, namely by executing the action "throw left" TL. However, the rules reflecting the given tasks to be carried out by the industrial system 10 do not allow this since throwing the item 34 into the waste bin 26 would not serve the purpose of carrying out the given tasks.

When the rules are set, potential state transitions between different system states can be defined. Pairs of nodes 38 are connected by means of edges 40 in between. One node 38 of each pair acting as a pre-condition node 38 and the other node 38 of each pair acting as a post-condition node 38. Each edge 40 represents at least one action for a direct state transition between two system states represented by nodes 38.

In this example, not all pairs of nodes 38 can be directly connected by means of an edge 40. Examples of potential state transitions that would be possible with the available actions but that do not fulfil the rules are illustrated with dotted line arrows. For example, although the industrial system 10 is capable of carrying out a direct state transition from the system state (1, 0) to (0, 0), i.e. by the action "throw left" TL, such transition would not fulfil the rules.

It should be noted that already in the state machine representation of the very simple industrial system 10 comprising four nodes 38, the total number of edges 40 and potential connections becomes relatively high. For a more comprehensive industrial system 10, one could not readily manually detect the edges 40. Instead, the edges 40 can be detected automatically by evaluating for a plurality of pairs of nodes 38, whether or not the pair can, given the rules, be directly connected by means of an edge 40. A list of available edges 40 can then be optimized by determining preferred chains of state transitions. This type of evaluation and optimization is previously known, for example from international patent application WO 2018086677 A1.

The state machine 36 according to the present disclosure further comprises execution values 42 assigned to a plurality of edges 40, as will be described below. The execution values 42 may be assigned to one, several or all edges 40. FIG. 2 illustrates an example of execution values 42 associated with the edge 40 between the agent states (0, 1) and (0, 0).

Once the state machine representation has been provided, a program comprising a plurality of actions for controlling the industrial system 10 is provided based on the state machine representation. The program may comprise sequences of various actions, such as movements by the agents 14, 16. The program is then run a plurality of times such that the agents 14, 16 execute the respective actions.

Assume that the right arm 16 sometimes fails in placing the item 34 on the coaster 24 during execution of the program. When failing to place the item 34 on the coaster 24, the item 34 can either land on the table 22 next to the coaster 24, or on the floor 28. During execution of the program, the outcomes of actions are recorded.

In this example, the execution values 42 of the action between the agent states (0, 1) and (0, 0) comprise a discrete probability distribution x, y, z, where x represents the probability of the outcome of successfully placing the item 34 on the coaster 24, y represents the probability of the outcome of failing to place the item 34 on the coaster 24 where the item 34 remains on the table 22, and z represents the probability of the outcome of failing to place the item 34 on the coaster 24 where the item 34 falls to the floor 28. The execution values 42 of the of the action between the agent states (0, 1) and (0, 0) thus represent a transition probability "x" of success of the action, a transition probability "y" of failure of the action and the outcome of the item 34 ending up on the table 22, and a transition probability "z" of failure of the action and the outcome of the item 34 ending up on the floor 28. Thus, for each executed action, it is recorded whether the action succeeded or what the outcome was. In this example, each value of the probability distribution may be said to constitute an execution value and these execution values may also be referred to as execution data.

By considering transition probabilities, the state machine representation is made more conforming to reality, it is made possible to keep track of the high level performance of each agent 14, 16, and undesired system states can be avoided. For example, if it is undesired that the item 34 lands on the floor 28, actions having an associated execution value 42 indicating a certain probability of the item 34 landing on the floor 28 can be avoided. Thereby, the program can be made less error prone and a failure rate of the industrial system 10 can be reduced.

The distribution x, y, z is however merely one example of execution values 42 according to the present disclosure. Alternative or additional types of execution values 42 may be recorded and assigned to associated edges 40, such as the execution time for each action. For example, in case the state machine 36 comprises execution values 42 indicative of a time for executing an action, an improved time optimization of the program can be performed. The execution values 42 are indicative of a value of choosing an action.

The program may be run several times while recording outcomes of each action, such as execution times and probabilities of success. The state machine representation of the industrial system 10 is updated by modifying execution values 42 of edges 40 based on actual outcomes of executed actions represented by the respective edge 40. The updating may take place more or less frequently, e.g. after completion of each action or after completion of a cycle comprising a plurality of actions.

By collecting data regarding outcomes of actions, such as execution times, probabilities of success, and degrees of success, the execution quality of the program for controlling the industrial system 10 can be improved.

The components of the state machine 36 are thus modified based on which actions that can lead to different system states, and with which probability. By means of the modified execution values 42 of the state machine 36, it can be more accurately determined how often an action fails, in which way the action fails, and how long the execution time of the action is.

Various types of optimizations of the program can be performed based on execution values 42 that have been modified based on outcomes of executed actions, for example minimizing cycle time, minimizing errors, increasing efficiency, minimizing waste and/or minimizing energy consumption. The modified state machine 36 can for example be used to create an updated Markov Decision Process (MDP). Thus, the entire high level program of the industrial system 10 can be modelled as an MDP and solved efficiently by a good initialization. The MDP can for example be solved using Bellman update, e.g. value iteration, Q learning and policy iteration. The state transitions of the state machine 36 can then be optimized based on the modified execution values 42.

Furthermore, the execution values 42 can be used to provide an improved error tracking of the program. To this end, a plurality of first execution values 42 can be determined based on executed actions. The first execution values 42 are then compared with associated second execution values 42. The second execution values 42 may for example be execution values 42 of the state machine 36, or other reference execution values 42. A group of first execution values 42 that differs from their associated second execution values 42 can then be extracted.

In this regard, it may for example be evaluated whether execution values 42 of a group of first execution values 42 collectively differ more than a steady state variation of the associated second execution values 42. Alternatively, probability distributions may be used to evaluate whether first execution values 42 of a group collectively differ from corresponding second execution values 42. As a further example, a probability that the first execution values 42 come from a historic probability distribution of associated second execution values 42 can be calculated.

If it is determined that a collective probability distribution of the group of differing first execution values 42 indicates an improbable event, it can be concluded that an error is present. Furthermore, if all, or substantially all, of the group of these first execution values 42 belong to edges 40 associated with actions carried out by a specific agent 14, 16, it can be concluded that an error is present in this agent 14, 16. In this way, an early detection of declined performance of the agent 14, 16 can be made. A warning can then be issued to an operator.

Thus, instead of directly monitoring all potential error sources of the industrial system 10 (which may require thousands of sensors), the actual performance of the industrial system 10 is monitored and conclusions regarding errors or other changes can be drawn based on the actual performance of the industrial system 10. Since all actions of the industrial system 10 are performed by one or more agents 14, 16, a failure of one agent 14, 16 is likely correlated with several actions involving the same agent 14, 16.

If only one determined first execution value 42 would be considered in isolation, it may be difficult to determine whether a difference between this determined first execution value 42 and a corresponding second execution value 42 of the state machine 36 is occasioned by an error, or if the difference is within a standard deviation or steady state variation. By only considering one determined first execution value 42 in isolation, a relatively high deviation would be needed in order to be confident enough to conclude that there is an error. However, by evaluating a plurality of determined first execution values 42 collectively in view of corresponding second execution values 42 of the state machine 36 (or in view of target execution values 42), it can be concluded that an error is present in an agent 14, 16 even if only a relatively small deviation is present in several determined execution values 42 of the same agent 14, 16.

While the present disclosure has been described with reference to exemplary embodiments, it will be appreciated that the present invention is not limited to what has been described above. For example, it will be appreciated that the dimensions of the parts may be varied as needed.

The invention claimed is:

1. A method of controlling an industrial system comprising at least one agent, the method comprising:
monitoring, via at least one sensor, the at least agent to identify discrete system states of the industrial system,
providing, in a control system, a representation of the industrial system as a finite state machine, the state machine including a plurality of nodes and a plurality of edges, where each node represents one of the discrete system states of the industrial system, each edge represents an action for a state transition between system states represented by two of the nodes, and at least one execution value is associated with at least one of the edges;
running in the control system a program comprising at least one action to be executed by the at least one agent, the at least one action being represented by at least one of the edges;
modifying, by the control system, at least one execution value associated with at least one of the edges representing the at least one executed action, based on an outcome of the at least one executed action;
modifying the program of the industrial system based on the at least one modified execution value, the program including at least one command that instructs the at least one agent to execute at least one action based on the modified state machine; and
executing the program.

2. The method according to claim 1, wherein the at least one execution value comprises a time of executing the action.

3. The method according to claim 1, wherein the at least one execution value comprises a probability of success of the action.

4. The method according to claim 1, wherein the at least one execution value comprises a degree of success of the action.

5. The method according to claim 1, wherein a plurality of execution values is associated with at least one of the edges.

6. The method according to claim 1, wherein the at least one agent is a physical actuator.

7. The method according to claim 1, wherein the execution of the at least one action by the at least one agent includes executing at least one action by each of a plurality of agents.

8. The method according to claim 1, wherein the at least one action comprises a movement of the at least one agent.

9. The method according to claim 1, further comprising optimizing state transitions of the state machine based on the at least one modified execution value.

10. The method according to claim 1, further comprising:
executing a plurality of actions by at least one agent, each action being represented by one of the edges;
determining at least one execution value based on an outcome of each of the plurality of executed actions; and
evaluating whether execution values of a group of the determined execution values differ from corresponding execution values of the state machine, or from corresponding target execution values.

11. The method according to claim 10, further comprising:
executing a plurality of actions by each of a plurality of agents; and
determining whether the group of the determined execution values is associated with a single agent of the plurality of agents.

12. The method according to claim 10, wherein the determination whether execution values of the group of the determined execution values differ from corresponding execution values of the state machine, or from corresponding target execution values, is made by means of probability distributions.

13. The method according to claim 2, wherein the at least one execution value comprises a probability of success of the action.

14. The method according to claim 2, wherein the at least one execution value comprises a degree of success of the action.

15. The method according to claim 2, wherein a plurality of execution values is associated with at least one of the edges.

16. The method according to claim 2, wherein the at least one agent is a physical actuator.

17. A control system for controlling an industrial system comprising at least one agent, the control system including a data processing device and a memory having a computer program stored thereon, the computer program comprising program code which, when executed by the data processing device, causes the data processing device to perform the steps of:
monitoring, via at least one sensor, the at least one agent to identify discrete system states of the industrial system,
providing a representation of the industrial system as a finite state machine, the state machine including a plurality of nodes and a plurality of edges, where each node represents one of the discrete system states of the industrial system, each edge represents an action for a state transition between system states represented by two of the nodes, and at least one execution value is associated with at least one of the edges;
running a program comprising at least one action to be executed by the at least one agent, the at least one action being represented by at least one of the edges;
modifying at least one execution value associated with at least one of the edges representing the at least one executed action, based on an outcome of the at least one executed action;
modifying the program of the industrial system based on the at least one modified execution value, the program including at least one command that instructs the at least one agent to execute at least one action based on the modified state machine; and
executing the program.

18. An industrial system comprising the control system according to claim 17.

19. A method of controlling an industrial system comprising at least one agent, the method comprising:
providing, in a control system, a representation of the industrial system as a finite state machine, the state machine including a plurality of nodes and a plurality of edges, where each node represents a discrete system state of the industrial system, each edge represents an action for a state transition between system states represented by two of the nodes, and at least one execution value is associated with at least one of the edges;

controlling, via the control system, execution of at least one action by the at least one agent, the at least one action being represented by at least one of the edges;

identifying, via at least one sensor, a first agent state of the at least one agent before the at least one executed action and a second agent state of the at least one agent after the at least one executed action;

recording an outcome of the at least one executed action;

modifying, by the control system, at least one execution value associated with at least one of the edges representing the at least one executed action, based on the outcome of the at least one executed action;

using the modified execution value to adjust control of the at least one agent to perform a subsequent action for transitioning between the first and second agent states.

* * * * *